Nov. 15, 1927.                                                1,649,306
A. S. HAWKS
INTERNAL COMBUSTION ENGINE CONTROL GEAR
Filed Jan. 18, 1921
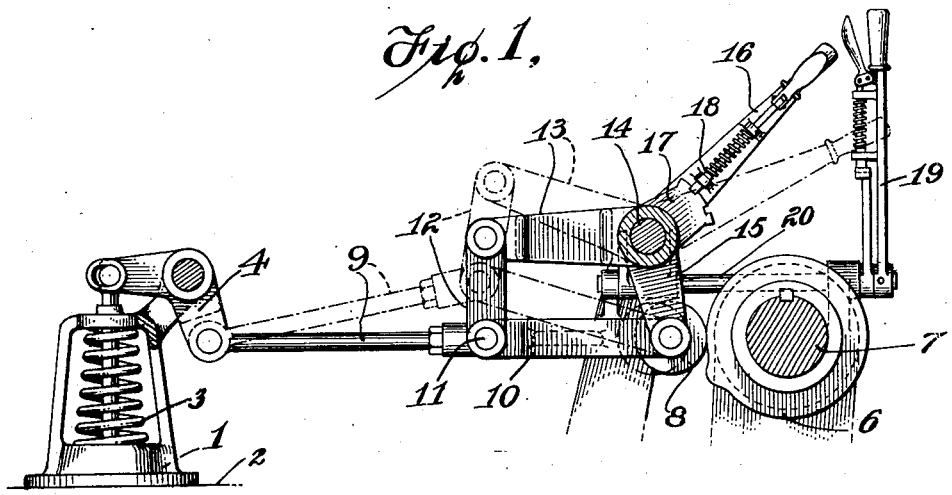
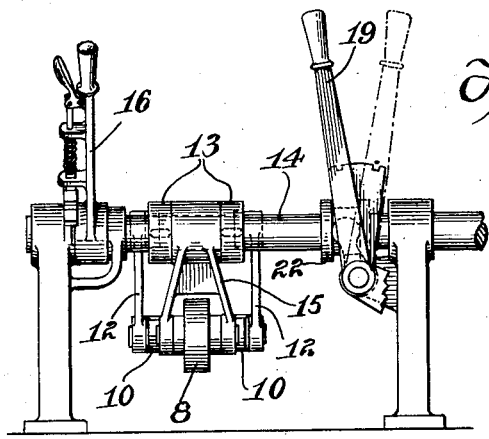
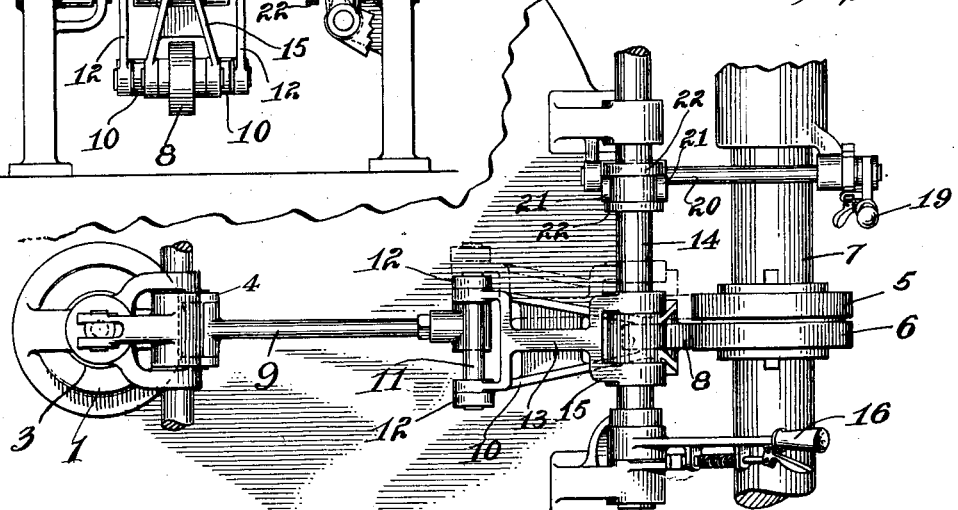

Patented Nov. 15, 1927.

1,649,306

UNITED STATES PATENT OFFICE.

ARTHUR S. HAWKS, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION-ENGINE CONTROL GEAR.

Application filed January 18, 1921. Serial No. 438,066.

The invention relates to valve gearing for internal combustion engines, particularly reversible engines, and consists of a form of operating connection between an engine valve and a valve operating shaft which can be very easily shifted from its forward to its reverse setting and vice versa, that is to say, from a position in which it is engaged or operated by one valve operating element or valve cam to a position in which it is operated by another. This result is accomplished by constituting said operating connection so that it is readily changeable in respect to the length of its normal span and is thereby capable of being separated from operative relation to the cams and at the same time is relieved from the normal pressure of the latter, or of the valve spring, being thereby adapted to be freely shifted from one cam to another. Valve operating connections having these facilities may be constructed in various forms within the principle of this invention, and the form shown in the accompanying drawings will suffice to illustrate that principle. The said form is adapted to be used in substitution for the common push rod used in many engines between the cam follower and the valve. In the accompanying drawing, Fig. 1 illustrates the valve connection in side elevation and more or less diagrammatically shows the engine valve and its operating cam shaft. Fig. 2 is an elevation of the connection from the cam shaft side and Fig. 3 a top plan.

The valve to be operated is marked 1, being assumed to be appropriately mounted in an engine cylinder head 2 or otherwise, and is provided with a valve spring 3 and a bell crank by which it may be opened against the spring tension and to which the valve operating connection of this invention is connected. It will be understood that this valve and its bell crank are merely representative of any engine valve requiring to be operated by different cams for forward and reverse running or for any other purpose. The cam for operating the valve in one direction is marked 5 and the cam for operating the valve for the reverse direction of running is marked 6 and both are carried on the same shaft 7, which will be assumed to be connected with the engine crank shaft in some suitable way. The valve operating connection, according to the special form of this invention taken for illustration, consists of two push rod links or sections 9 and 10 pivotally united at 11, the section 9 being pivotally connected also to the bell crank 4 and the section 10 being supplied with a cam follower roller 8 adapted for engagement by the cams 5 and 6. The cam follower end of the link or push rod section 10 is supported in proper relation to the cams by a link 15 swinging freely from a shaft 14 and the pivotal joint 11 between the sections is supported by a link 12 hung from the end of a crank arm 13 fast to the shaft 14. A lever 16 provided with a notched segment 17 and latch 18 is splined on the shaft 14 and when in the position shown by the full lines of Fig. 1, causes the latter to hold the two push rod sections in a straight line or dead center operating position between the cams and the valve. In this position, the cam follower 8 is engaged with the cam 5 or 6, as the case may be, being subject to pressure thereagainst by the effect of the valve spring 3, and the rotation of the cam will reciprocate the aligned push rod sections quite the same as if they were a single or one piece push rod as in ordinary construction. When, however, the hand lever 16 is moved to the dotted line position of Fig. 1, the link 12 will pull the pivotal joint 11 upwardly, as indicated, thereby displacing it from its former dead-center relation and collapsing the valve connection as a whole, so that the cam follower 8 is withdrawn from its operating cam, or at least relieved from its normal pressure thereagainst. Under this condition, the valve operating connection can be easily reset for engagement by the adjacent cam and the provisions for this purpose consist in making the hinge pin 11 between the sections of sufficient length to permit the push rod section 10 to be slid laterally, or in the direction of the axis of the joint, as indicated by the dotted lines in Fig. 4 and by such movement to carry the cam follower 8 from alignment with the cam 6 into alignment with the cam 5; this is done in the case in hand, by mounting the crank arm 13 rigidly on the reversing shaft 14 and supporting the latter so that it may be moved endwise by means of the lever 19. This lever is connected to a cross shaft 20 provided with a fork 21 engaging collars 22 on the shaft. This method of shifting the cam follower has the obvious advantage that in the case of a multi-cylinder engine, all of the cam followers, similarly related to the shaft 14, may be simultaneously shifted. When the cam follower has been located in its new position, it is obvious that by restoring the lever 16 to the full lined position of Fig. 1, the push rod sections will again be brought into their dead center relation for operation by the cam 5 or whatever valve operating agency is employed, there being no limitation to the use of cams for this purpose.

It will thus be seen that the valve operating connection, above described, is adapted to be quickly changed in respect to the length of its operating span or distance from the valve to the cam follower, so as to relieve it not only of the spring pressure but also to separate it from the range of action of one cam so that it can be shifted into the range of action of another cam, and it will be apparent that by the employment of jointed links in the relation stated, the restoration of the structure to its operating condition and into the pressure influence of the valve spring and cam is accomplished with the mechanical advantage of a toggle action which makes the operation an easy one to perform.

It is also obvious that, according to the preference of the builder, the whole or any part of the operating connection can be caused to be shifted when the pressure has been relieved, it being of course the principal object of such movement to transfer the connection from one cam to the other and this irrespective of whether one cam follower is used or more.

It will be apparent that the link 12 serves to maintain the sections of the push rod structure in substantially a dead center relation in so far as it prevents collapse of the structure until the said link is intentionally displaced by the rocking of the reversing shaft 14.

Certain features of the structure above described are shown and claimed in my copending application.

Claims—

1. In an internal combustion engine, the combination of a valve, a plurality of adjacent elements to operate the valve, a structure to transmit motion from either of said elements to the valve, and means for changing the relation between said structure and said operating elements to change the actuation of the valve from one of said elements to another, characterized by the fact that said structure comprises a plurality of members arranged to be displaced with respect to each other to collapse the structure as a whole in a direction substantially parallel to the direction of the motion given to the structure by the valve-operating elements when operating the valve, so that in all positions of the valve-operating elements starting the collapsing movement relieves any substantial pressure that may be exerted on said structure by the actuating elements, and said means for changing the operating position of said structure from one element to the other being arranged to permit such change while the structure is collapsed.

2. A valve gearing for combustion engines comprising a push-rod structure formed of pivotally united sections, a link supporting the joint between said sections to hold said sections substantially in alignment with each other, and means for displacing said joint to discontinue said alignment to relieve the structure of its operating pressure and for shifting a section when the joint is so displaced.

3. A valve gearing for combustion engines, comprising a push rod structure formed of jointed sections, normally supported substantially in alignment with each other, means for displacing the joint and a reversing lever adapted to be operated when said joint is displaced.

4. In an internal combustion engine, the combination of a valve means, a plurality of actuating members therefor, a connector for transmitting motion from said actuating members to said valve means, said connector incorporating links hinged to each other, means for supporting the joint between the links and for displacing the joint to discontinue the connection of the valve means to the valve actuating members, and means for changing the relation of the connector to the valve actuating members to change the actuation of the valve from one member to the other.

5. In an internal combustion engine, the combination of a single valve, actuating means therefor, a connector for transmitting motion from the actuating means to the valve, said connector incorporating links hinged to each other, means for supporting the joint between the links and for displacing the joint to discontinue the connection of the valve to the actuating means, and means for changing the relations of the valve to the actuating means to change the timing of the valve, said means for changing the relations being operable while the connection between the valve and the actuating means are discontinued.

6. In an internal combustion engine, the combination of a single valve, a plurality of valve operating members, a connector for transmitting motion from either of the valve operating members to the valve, said connector incorporating a push rod comprehending hinged links hinged to each other, means for supporting the joint between said links and displacing the same to shorten the effective length of the push rod, and means for changing the relations between the connector and the valve operating members, to change the operation of the valve from one of said members to another, while said joint is so displaced.

7. In an internal combustion engine, the combination of a valve, a plurality of adjacent elements to operate the valve, a structure to transmit motion from either of said elements to the valve and including a member to engage said elements, and means for moving said member with respect to said valve and the valve-operating elements to change the actuation of the valve from one of said elements to another, characterized by the fact that said structure includes a plurality of members arranged to be displaced with respect to each other to collapse the structure as a whole in a direction substantially parallel to the direction of motion given to the structure by the valve-operating elements when operating the valve, and that said means for moving said member from one element to another is arranged to so move said member while the structure is collapsed.

In testimony whereof, I have signed this specification.

ARTHUR S. HAWKS.